C. M. McCALL.
SELF DRAINING HOSE REEL.
APPLICATION FILED JUNE 18, 1912.
1,130,313.
Patented Mar. 2, 1915.
2 SHEETS—SHEET 2.
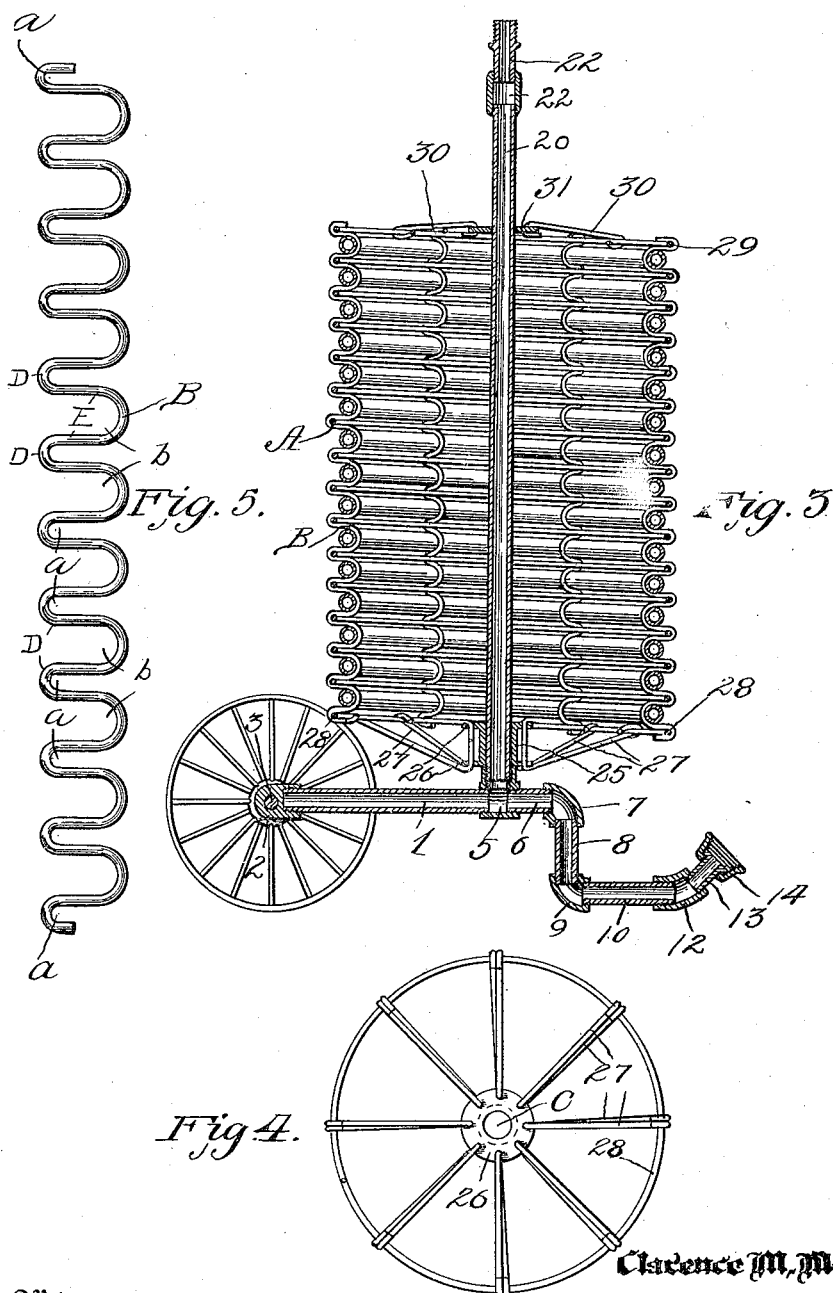
Witnesses
Philip A. Terrell
Edwin F. McKee
Inventor
Clarence M. McCall
By George W. Sues
Attorney

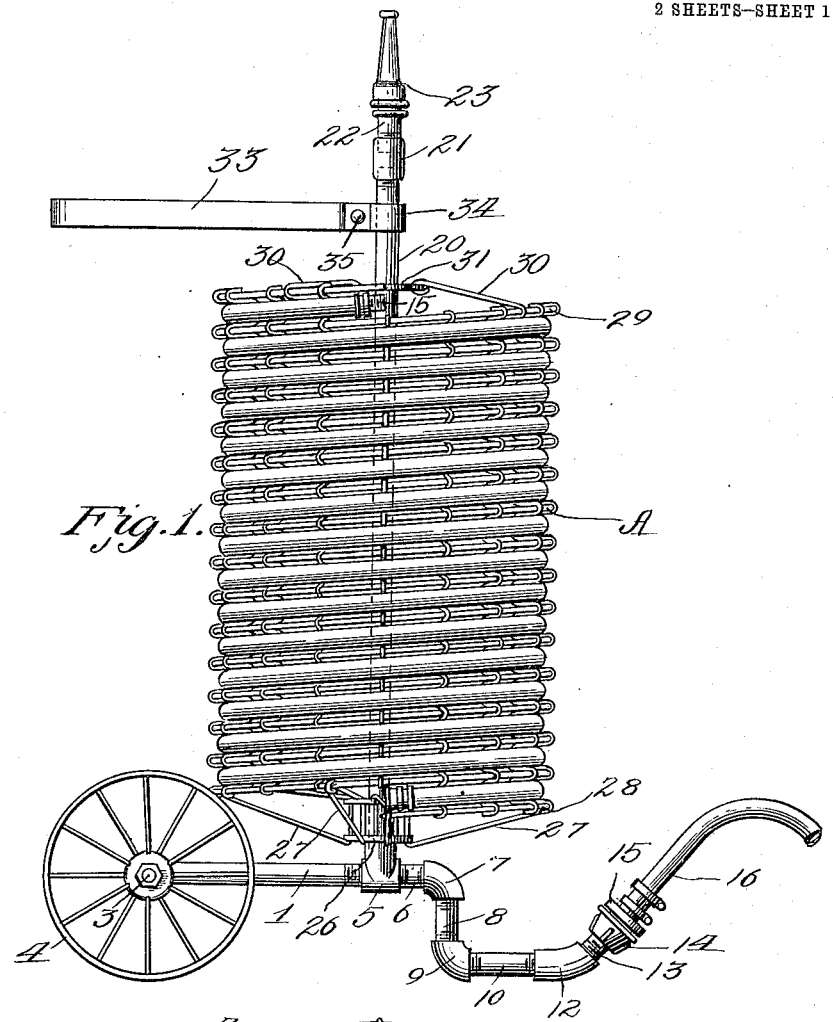

UNITED STATES PATENT OFFICE.

CLARENCE M. McCALL, OF MARION, NORTH CAROLINA.

SELF-DRAINING HOSE-REEL.

1,130,313.                    Specification of Letters Patent.    Patented Mar. 2, 1915.

Application filed June 18, 1912. Serial No. 704,262.

*To all whom it may concern:*

Be it known that I, CLARENCE M. McCALL, a citizen of the United States, and a resident of Marion, in the county of McDowell and State of North Carolina, have invented certain new and useful Improvements in Self-Draining Hose-Reels, of which the following is a specification, reference being had to the accompanying drawings.

This invention relates to certain new and useful improvements in portable reels employed in connection with garden hose, and comprises a carriage carrying a stand pipe serving as an axle to revolubly hold a wire hose reel, the stand pipe also serving as a nozzle: and the primary object of my invention is to provide a portable garden hose reel of a simple and inexpensive nature, and a compact and durable construction, arranged so that the hose can be conveniently coiled upon the reel which is normally held in a vertical position, insuring the hose being fully drained, the reel supporting pipe also serving as a nozzle as well as a handle by means of which the reel can be drawn from place to place.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views: Figure 1, shows a side elevational view of a draining hose reel embodying my invention. Fig. 2, is a top view of Fig. 1. Fig. 3, is a central sectional view through Fig. 1. Fig. 4, is a bottom view of the reel. Fig. 5, shows a detail of one of the rack members as employed in my invention.

In my present invention I provide a portable garden hose reel so constructed that the reel proper may do service as a fountain, and the device embodies a means for conveniently coiling the garden hose which is, while not in use, so held as to thoroughly drain, insuring the interior of the hose being dry at all times, and thus aiding to increase the life of the hose.

In carrying out the aim of my invention I employ what I term a base pipe 1, which has secured to it an ordinary T 2. Passing through this T 2, as shown in Fig. 2, is the axle 3 to which are secured the wheels 4, 4. Secured to the outer end of the base pipe 1, is a T 5, while secured to this T is the nipple 6, attached to the elbow 7, connected to a nipple 8 which in turn is secured to the elbow 9. Secured to the elbow 9 is a nipple 10, to which is secured the curved section 12, into which is secured the flanged nipple 13 carrying the threaded socket 14, arranged to receive the threaded nozzle end 15, of the hose. In Fig. 1, in order to disclose the method of securing the garden hose to the base pipe and its connection, I have shown a fragmentary section of a garden hose 16.

As shown in Figs. 1 and 3, the crook formed by means of the pipe member 3, 8 and 10 is of such a length that when the elbow 9 rests upon the ground the base pipe 1 will be held horizontal to the base upon which the reel stands.

Threading into the T 5, is the stand pipe 20. This stand pipe, as shown more clearly in Fig. 3, is provided with a union 21 near its end, and a nozzle collar 22, this collar being arranged to receive a suitable nozzle 24, as shown in Fig. 1. Revolubly held upon the stand pipe 20, and rotating upon the end of the T 5, is the flanged hub 25, having the apertured edge flanges 26. Passing through the apertures within the oppositely positioned flanges 26 are the wire brackets 27, the ends of which are bent about the terminal coil 28 of the spiral wire reel A. These brackets are bent into a right angled triangle as clearly shown in Figs. 1 and 3, so as to brace as well as support the reel structure. At its upper end the ending reel coil 29 has secured to it the wire spokes 30 which have their inner ends engaged within a disk 31 revolubly held upon the stand pipe 20. In order to hold the spiral coils A in proper spaced relation, I use a plurality of wire stay members alternately bent in and out, one of these sinuous members being shown in Fig. 5. A plurality of such stay members are employed. Each ends in a terminal hook $a$, arranged to be secured to the top and bottom members of the reel coil. Each brace member, though, is bent inward to provide a plurality of alined curved portions B as shown in Fig. 5, forming the hose receiving seats $b$ and a plurality of smaller curved parts D, to form the wire coil receiving seats $a$. The reel forming coil A, is secured within a plurality of the seats by means of solder or by any other suitable means. As shown in Fig. 5, each major curved portion B is continued in two parallel straight portions E, which in turn end in the inner curved portions D, forming the coil seats, as shown in the drawings. Any suitable number of these sinuous brace members are employed.

From the foregoing it will be seen, that the stand 20 is provided with a skeleton reel comprising the wire coil A, a plurality of wire stay members and the bottom brackets 27, and top spokes 30 suitably secured to the hub 25 and disk 31.

In the use of the reel, the hose has one end attached to a suitable source of water supply, while the nozzle end of the hose is secured to the collar 14. On turning on the water and placing the stand upright, the nozzle thereof will serve as a fountain. When the hose is to be wound, the operator places the reel in a horizontal position, this being possible because the stand pipe 20, at the nozzle end is provided with the V-shaped supporting standard 33 having the collar portion 34 arranged to engage the standpipe 20. The standard 33 is secured by means of a rivet 35. As shown in Fig. 2, the standard 33, extends outward as far as the outermost point of the wheels, so that when the stand pipe 20 is tilted in a horizontal position the pipe will be supported by the wheels 4 and the standard 33 in a horizontal plane. In this position the hose can be easily wound upon the skeleton reel. The reel can then be trundled to any suitable point in using the nozzle, or the end of the stand pipe as a handle. As soon as the reel is placed in an upright position every particle of water within the hose will drain out of the same while it will further be possible for the air to circulate through the hose insuring the same being kept perfectly dry upon the inside.

It is, of course, understood that hose reels embodying my invention can be made of various sizes. So also if desired two runners may be employed though the employment of the wheels is preferable.

My hose reel is simple and inexpensive in construction and both durable and efficient in operation: the hose will drain as long as the stand pipe is in an upright position, and the hose can be wound upon the skeleton reel or detached therefrom with ease, accuracy and despatch.

Having thus described my said invention, what I claim as new and desire to secure by United States Letters Patent is:

1. In a device of the character described, comprising a hub having oppositely positioned apertured edge flanges, a plurality of triangular wire brackets passing through said flanges and extending outwardly, a centrally apertured disk having concentrically arranged apertures adjacent the outer edge thereof, a plurality of wire spokes secured within said concentrically arranged apertures, a spiral wire coil having one end secured to said wire brackets and the opposite end to said spokes, a plurality of sinuous stay wires bent inward to form hose receiving seats and outward to provide seats for said wire coil, said stays being secured to said wire coil to hold said coils in spaced relation, and a support passing through said hub and disk.

2. In a device of the character described, the combination of a plurality of sinuous stay wires bent inwardly to form spaced hose receiving seats, a spiral wire coil securing said stay wires in spaced relation, a hub disposed centrally of said wire coil at one end thereof, an apertured disk spaced centrally of said wire coil adjacent the opposite end thereof, a support passing through said hub and disk and means extending from said hub and disk for retaining said coil and hose seats concentrically to said support.

In testimony whereof I affix my signature, in presence of two witnesses.

CLARENCE M. McCALL.

Witnesses:
MAYME NORTON,
J. Z. PAGE.

Copies of this patent may be obtained for five cents each, by addressing the "Commissioner of Patents, Washington, D. C."